Feb. 18, 1941.  R. C. ZUCKERMAN  2,231,983
DITCH DIGGER
Filed July 6, 1938   3 Sheets-Sheet 1

INVENTOR
R.C. Zuckerman
BY
ATTORNEY

Feb. 18, 1941.   R. C. ZUCKERMAN   2,231,983
DITCH DIGGER
Filed July 6, 1938   3 Sheets-Sheet 2
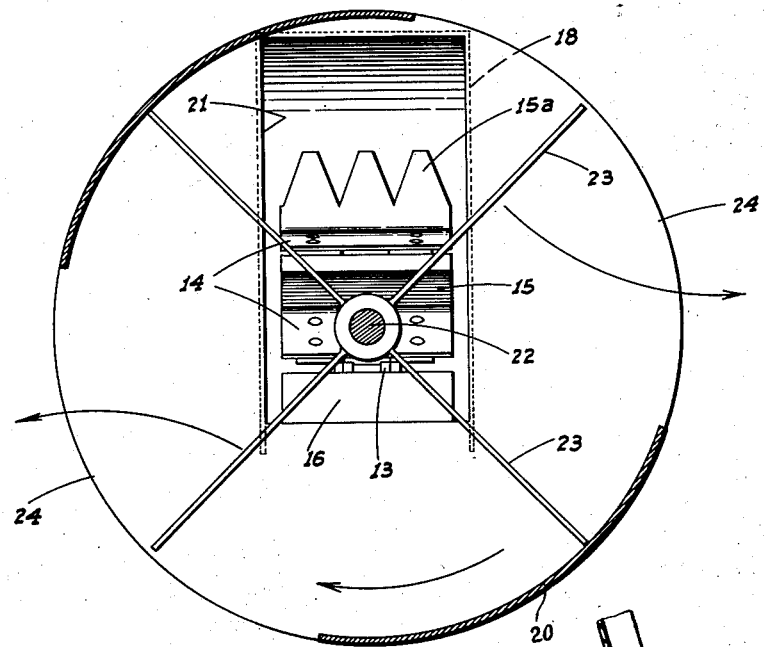
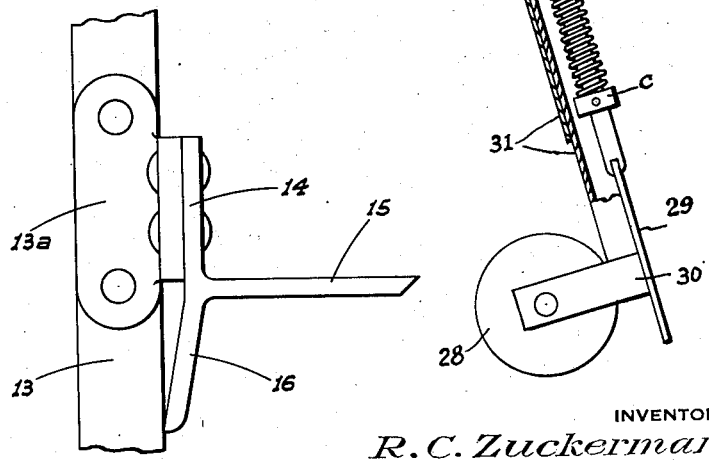
INVENTOR
R. C. Zuckerman
BY
ATTORNEY Feb. 18, 1941.  R. C. ZUCKERMAN  2,231,983
DITCH DIGGER
Filed July 6, 1938  3 Sheets-Sheet 3
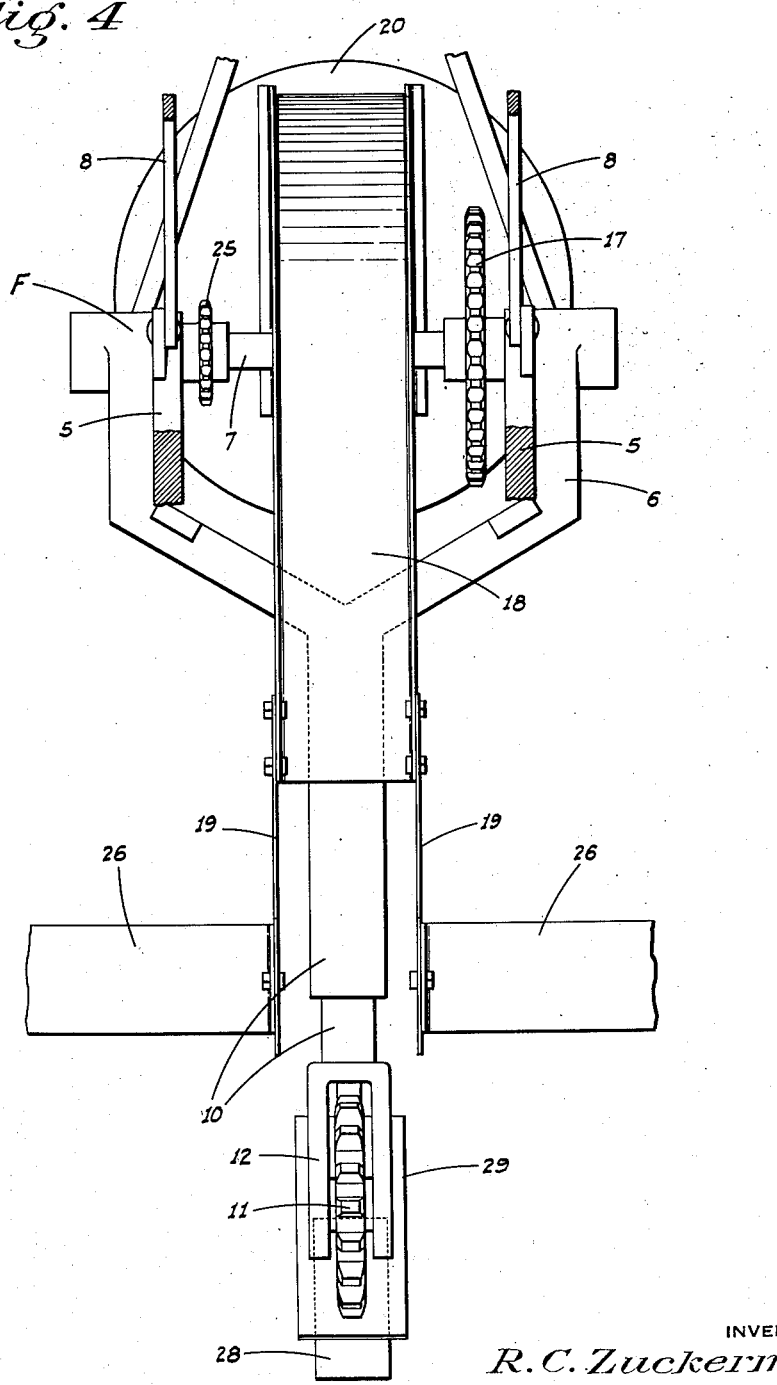
INVENTOR
R.C. Zuckerman
BY
ATTORNEY Patented Feb. 18, 1941

2,231,983

UNITED STATES PATENT OFFICE 2,231,983

DITCH DIGGER

Roscoe C. Zuckerman, Stockton, Calif.

Application July 6, 1938, Serial No. 217,706

4 Claims. (Cl. 37—86)

This invention relates to ditch diggers, and particularly to one adapted to be mounted on and supported by a tractor, power from which operates the digger as well as pulling it along the ditch as it is dug.

My improved digger is especially designed for digging relatively small irrigation ditches in land which has been prepared for the planting of crops and is thus loose, but before such planting is performed.

The major object of my invention is to provide a digger of the above recited general character which will be very rapid and efficient in operation, and from which the dirt as dug is thrown as a relatively fine and widely distributed cloud to both sides of and clear of the ditch.

In this manner, the level of the land is not materially altered so that the subsequent planting operations, when carried out adjacent the ditch, are not interfered with or affected in any way.

A further object is to provide a means for enabling the digging depth of the digger to be easily altered and positively maintained, and a separate means for raising the digger out of the ground without affecting its digging-depth setting.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 2 is an enlarged rear end view of the dirt distributing member, taken on line 2—2 of Fig. 1.

Figure 3 is a fragmentary side view showing one of the digger blades as mounted on the chain.

Figure 4 is an enlarged fragmentary front view of the digger boom and adjacent parts, with the digger and drive chains removed.

Figure 5 is a sectional elevation of the stabilizing roller unit, detached.

Figure 1:
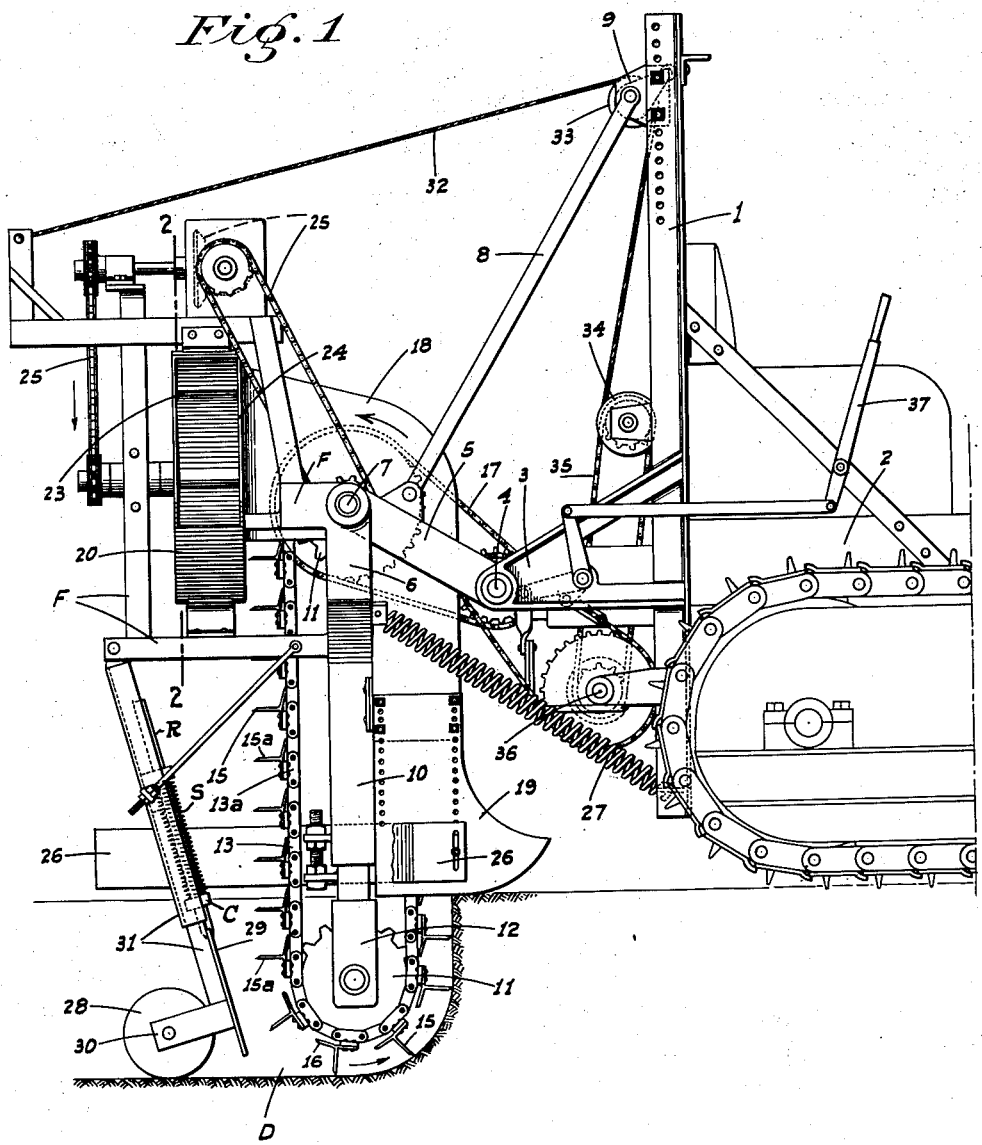
Figure 1 is a side elevation of my improved digger as in operation.

Referring now more particularly to the characters of reference on the drawings, the digger comprises a pair of main supporting standards, one of which is shown at 1, and which are adapted to be rigidly mounted on the back end of a tractor 2 in any suitable manner in transversely spaced relation. A rearwardly projecting bracket 3 is rigid with each standard intermediate its ends and serves as one bearing support for a transverse shaft 4, which is alined with and coupled to, or may actually be, the ordinary power take-off shaft of the tractor.

Turnably mounted in connection with each bracket axially of shaft 4 is a rearwardly projecting arm 5 on the rear end of which the upper yoke member 6 of the digger frame F is swung, a transverse shaft 7 forming the connection between the arms of the yoke and both arms 5. Tension links 8 are pivoted at their lower ends on the arms 5 and at their upper ends on plates 9 secured for vertical adjustment on the standards 1. By altering the position of the plates 9, the angle of the arms 5 relative to a horizontal plane will be altered, and the height of the shaft 7 from the ground and which determines the digging depth, will also be altered as will be obvious.

A beam unit 10, adjustable as to length as is common in ditch digger construction, is rigid with and forms a part of the digger frame, depending from yoke 6 centrally thereof. A sprocket wheel 11 is journaled in a fork 12 on the lower end of the beam unit, while a similar sprocket wheel 11 is keyed on shaft 7.

An endless chain 13 passes about the sprockets, alternate links 13a of which are attachment links of standard form. A ditch digging element wider than the chain, is secured on each attachment link and comprises a base plate 14 rigidly secured on and extending parallel to the link and a digging plate extending from the base plate at right angles thereto and to the chain link and disposed at the trailing end thereof relative to the direction of travel of the chain. Alternate ones 15 of the digging plates are straight edged, while the intermediate plates 15a are toothed as shown in Fig. 2. The digging elements are also each provided with a rigid base plate extension 16 overhanging but not secured on the plain link behind, and engaging at its outer end with said link adjacent the following attachment when the chain is straight or outstretched, as shown in Fig. 3. In this manner the tendency of the attachment links to be deflected out of a straight line by the pressure against the digger plates when under load, is counteracted by the oppositely acting pressure of the base plate extensions against the intermediate links of the chain. The chain in operation therefore remains straight on the load side, without having to resort to excessive tightening of the chain. In addition to this function, the extension base plates, in connection with the fixed base plates, provide a practically continuous back wall which aids materially in retaining the dirt as dug and elevated.

A chain drive 17 between shafts 4 and 7 turns the latter so that the forward run of the digger chain travels up, and secured on the front side of the beam 10 and extending over the top to the back of the chain from a point clear of ground level is a housing 18 into which the chain and digger elements pass. Vertically adjustable side skirts 19 depend from the sides of the housing to ground level.

The housing at the top and just behind the digger structure, is secured on the front wall of a cylindrical relatively short but large diameter chamber 20 and discharges into said chamber through a rectangular opening 21 in said wall disposed mainly above the center thereof.

The chamber is mounted rigid with the digger frame F in any suitable manner with its axis horizontal (when the digger is in operation) or at right angles to the beam 10 and the runs of the chain, which are vertical when in operating position. A shaft 22 projects into the chamber 20 through its back wall axially thereof, and inside the chamber supports a plurality of flat radial vanes or paddles 23 having a relatively close fit with the end and peripheral walls of the chamber, the latter being provided with laterally opposed dirt discharge openings 24 extending the full distance between the end walls.

The chamber and vanes form a dirt distributing unit, the vane shaft being driven at a relatively high speed by suitable chain and gear drives from the shaft 7 and indicated generally at 25. The digger chain itself is also driven at a relatively high speed.

By reason of this digger and distributer arrangement, the already somewhat loose dirt as it is dug is broken up into relatively small particles, and as elevated to the top of the digger chain, is thrown centrifugally into the distributing chamber. Here the dirt is immediately picked up by the rapidly revolving vanes and thrown through both side openings of the chamber. The beating action imparted to the dirt by the vanes further breaks up the dirt, so that the dirt as thrown out is almost dust-like in character. A very even and unnoticeable distribution of the dirt onto the land to the sides of the ditch is thus obtained. In order to prevent any deposits of falling dirt possibly remaining too close to the ditch, laterally diverging plates 26 disposed adjacent ground level, project rearwardly from skirts 19.

Tension springs 27 between the yoke 6 and standards 1 yieldably maintain the digger structure in an upright position. Maintenance of such position, and offsetting the "teetering" action of the tractor evident at times, and which tends to offset the position of the digger, is aided by a roller 28 adapted to ride on the bottom of the ditch D close behind the digger.

This roller is fronted by a plate 29 riding in and the width of the ditch and rigid with the roller supporting fork 30. Both the fork and plate are rigid with the lower member of a telescopic arm unit 31, the members of which are preferably of channel form. The upper member of this unit is hung on and depends from a portion of frame F rearwardly of yoke 6. A rod R projects upwardly from plate 29, and slides through a block B fixed on the upper member of unit 31 above the lower member, and a compression spring S is disposed about the rod between the block and a collar C on the rod some distance below said plate, as plainly shown in Fig. 5. In this manner, the roller is mounted for vertical yielding movement.

The digger structure is swung upwardly and rearwardly about shaft 7, to raise the digger clear of the ground when desired, by means of a cable 32. This is connected to the uppermost and rearmost point on the frame F, so as to obtain all possible leverage as well as a relatively long arc of movement. The cable passes over a pulley 33 hung between the standards 1 adjacent the top, and down to and about a drum 34 turnably supported in connection with the standards. The drum is operatively connected by suitable drive means 35 with a jack shaft 36 supported from the standards and constantly driven from shaft 4.

The drive connection 35 is of course normally disengaged from the constantly rotating jackshaft, a clutch and brake structure, of a general nature such as are now used in connection with power control units or hoists, being disposed between the jackshaft and drive means 35. The operating of this structure, to cause the drum to be rotated or held at any desired position, is controlled from a lever 37 mounted on the tractor convenient to the operator from his seat thereon.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A ditch digger comprising a frame, an endless digger unit mounted on said frame and disposed substantially vertical when in operation, said unit including a horizontal transverse driven shaft at its upper end, a dirt distributing device mounted on the frame rearwardly of and adjacent the upper end of the unit and to which the latter delivers, said device being arranged to discharge laterally and including a rotary member having a horizontal rearwardly projecting drive shaft, a countershaft on the frame above the device and drive connections between said first named shaft and the countershaft and between said countershaft and the second named shaft.

2. A ditch digger comprising an endless digging unit disposed when in operation in a substantially vertical position, a cylindrical horizontal-axis chamber mounted in connection with the unit adjacent its upper end in transverse symmetrical relation thereto, said unit at its upper end discharging into the chamber above the axis thereof and a rotary device mounted axially in the chamber having radial blades extending substantially the full length and radius of the chamber; the circumferential wall of the chamber being cut away from adjacent the top down a certain distance on the side about which the blades move down, and being also cut away from adjacent the bottom up a certain distance on the side about which said blades move up.

3. A ditch digger comprising a supporting structure mounted for movement along the ground, a digger frame mounted on the structure, an endless digger unit mounted on the frame and normally depending below the structure whereby to dig a ditch, a stabilizing roller then engaging the bottom of the ditch behind the unit, and means mounting the roller in connection with the frame, said means including instrumentalities to allow of upward vertical movement of the roller relative to the digger unit, but yieldably resisting such movement.

4. A ditch digger comprising a frame, an endless downwardly extending digger unit mounted on the frame, a housing mounted on the frame and enclosing the upper portion of the upwardly moving run of the endless digger unit, but terminating above the lower end of said unit a predetermined distance, vertically adjustable skirts mounted on and depending from the sides of the housing and adapted to extend to adjacent the ground level irrespective of the digging depth of the unit, and laterally diverging plates mounted on the skirts adjacent the lower end and projecting rearwardly from said skirts.

ROSCOE C. ZUCKERMAN.